United States Patent
Dawkins et al.

(10) Patent No.: US 7,003,642 B2
(45) Date of Patent: Feb. 21, 2006

(54) SYSTEM AND METHOD FOR CONTROLLING ACCESS TO STORAGE IN A DISTRIBUTED INFORMATION HANDLING SYSTEM

(75) Inventors: William P. Dawkins, Round Rock, TX (US); Ahmad H. Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 352 days.

(21) Appl. No.: 10/124,528

(22) Filed: Apr. 17, 2002

(65) Prior Publication Data

US 2003/0200399 A1    Oct. 23, 2003

(51) Int. Cl.
*G06F 12/14* (2006.01)
(52) U.S. Cl. .................. 711/164; 711/152; 711/163
(58) Field of Classification Search ............. 711/163, 711/164, 152, 142, 154
See application file for complete search history.

(56) References Cited

U.S. PATENT DOCUMENTS

| | | | | |
|---|---|---|---|---|
| 6,061,753 | A * | 5/2000 | Ericson ................... | 710/107 |
| 6,260,120 | B1 * | 7/2001 | Blumenau et al. ......... | 711/152 |
| 6,295,575 | B1 * | 9/2001 | Blumenau et al. ......... | 711/5 |
| 6,343,324 | B1 * | 1/2002 | Hubis et al. .............. | 709/229 |
| 6,484,245 | B1 * | 11/2002 | Sanada et al. ............ | 711/164 |
| 6,606,695 | B1 * | 8/2003 | Kamano et al. .......... | 711/163 |
| 6,728,844 | B1 * | 4/2004 | Sanada et al. ............ | 711/152 |
| 6,779,083 | B1 * | 8/2004 | Ito et al. .................. | 711/114 |
| 6,799,255 | B1 * | 9/2004 | Blumenau et al. ........ | 711/152 |

OTHER PUBLICATIONS

Convergent Data Services Inc. 's "Zoning and LUN Masking—A Comparison for the SAN Market" CONFIDENTIAL pp 1-8 (Apr. 9, 2001).
Compaq Computer Corporation's Compaq Storage Works—SAN Switch Zoning Reference Guide, First Edition (Sep. 1999).
U.S. Appl. No. 09/770,571 entitled "System and Method For Host Based Target Device Masking Based on Unique Hardware Addresses," filed by Ahmad Tawil et al. on Jan. 26, 2001, Dell Products L.P. Assignee (DC-02668).

* cited by examiner

*Primary Examiner*—T Nguyen
(74) *Attorney, Agent, or Firm*—Baker Botts L.L.P.

(57) ABSTRACT

An example process for controlling access to a data storage device in a distributed information handling system includes the operation of receiving, at the storage device, a login request from a host. In response to the login request, the storage device may determine whether a host access table in the storage device includes an identifier for the host. If the host access table includes an identifier for the host, the storage device may allow the host to use the storage device. However, if the host access table does not include an identifier for the host, the storage device may prevent the host from using the storage device. Additional or alternative operations may include adding identifiers for specified hosts and a list of corresponding logical storage units to a mapping table. The data storage device may then deny access to hosts without identifiers in the mapping table.

17 Claims, 3 Drawing Sheets

| Host Access Table ||
|---|---|
| Index | Host WWN |
| 0 [Mgmt. Station] | 14 |
| 1 | 18 |
| 2 | 34 |
| 3 | 154 |
| 4 | null |
| ⋮ | ⋮ |
| 32 | 2512 |

| Mapping Table |||
|---|---|---|
| Index | LUN | Host WWN |
| 0 | 0 | 18 |
| 1 | 1,3 | 34 |
| 2 | 4 | 154 |
| 3 | 0,2 | 2512 |
| 4 | null | null |
| ⋮ | ⋮ | ⋮ |
| 32 | null | null |

SYSTEM AND METHOD FOR CONTROLLING ACCESS TO STORAGE IN A DISTRIBUTED INFORMATION HANDLING SYSTEM

TECHNICAL FIELD

The present disclosure relates in general to computer networks. In particular, this disclosure relates to a system and method for controlling access to a data storage device in a distributed information handling system.

BACKGROUND

As the value and use of information continues to increase, individuals and businesses seek additional ways to process and store information. Among the options available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a computer network, a data storage assembly may include multiple data storage devices in communication with a switch fabric containing one or more switches. Multiple hosts may be connected to the data storage assembly via the switch fabric. A network administrator may configure the network with access rules that control whether or not specific hosts may access various areas in one or more of the data storage devices. For instance, switch zoning is one common methodology for implementing access rules for data storage systems. Basically, switch zoning involves configuring the switch fabric to control which data storage devices can be detected by which hosts.

SUMMARY

The present disclosure relates to a system and a method for controlling access to a data storage device in a distributed information handling system. According to one example embodiment, a method for controlling access to a storage device includes the operation of receiving, at the storage device, a login request from a host. In response to the login request, the storage device may determine whether a host access table in the storage device includes an identifier for the host. If the host access table includes an identifier for the host, the storage device may allow the host to use the storage device. However, if the host access table does not include an identifier for the host, the storage device may prevent the host from using the storage device.

According to another example embodiment, a storage device for a distributed information handling system includes a storage medium, a communications interface in communication with the storage medium, and a host access table. The storage device also includes a control module in communication with the communications interface and the host access table. The control module may receive a login request from a host and, in response, determine whether the host access table includes an identifier for the host. If the host access table includes an identifier for the host, the control module may allow the host to use the storage device. Otherwise, the storage device may prevent the host from using the storage device.

Different embodiments of the invention may include additional or alternative features to those described above. For example, a method for controlling access to a storage device may include an operation of receiving, at the storage device, input from an administrator, wherein the input defines relationships between specified logical storage units in the storage device and specified hosts. In response to the input from the administrator, the storage device may add identifiers for the specified hosts and a list of corresponding logical storage units to a mapping table. The data storage device may then deny access to hosts without identifiers in the mapping table.

BRIEF DESCRIPTION OF THE DRAWINGS

The present disclosure and its numerous objects, features, and advantages may be better understood by reference to the following description of an example embodiment and the accompanying drawings, in which.

DETAILED DESCRIPTION OF AN EXAMPLE EMBODIMENT

Figures 1, 2, 3:
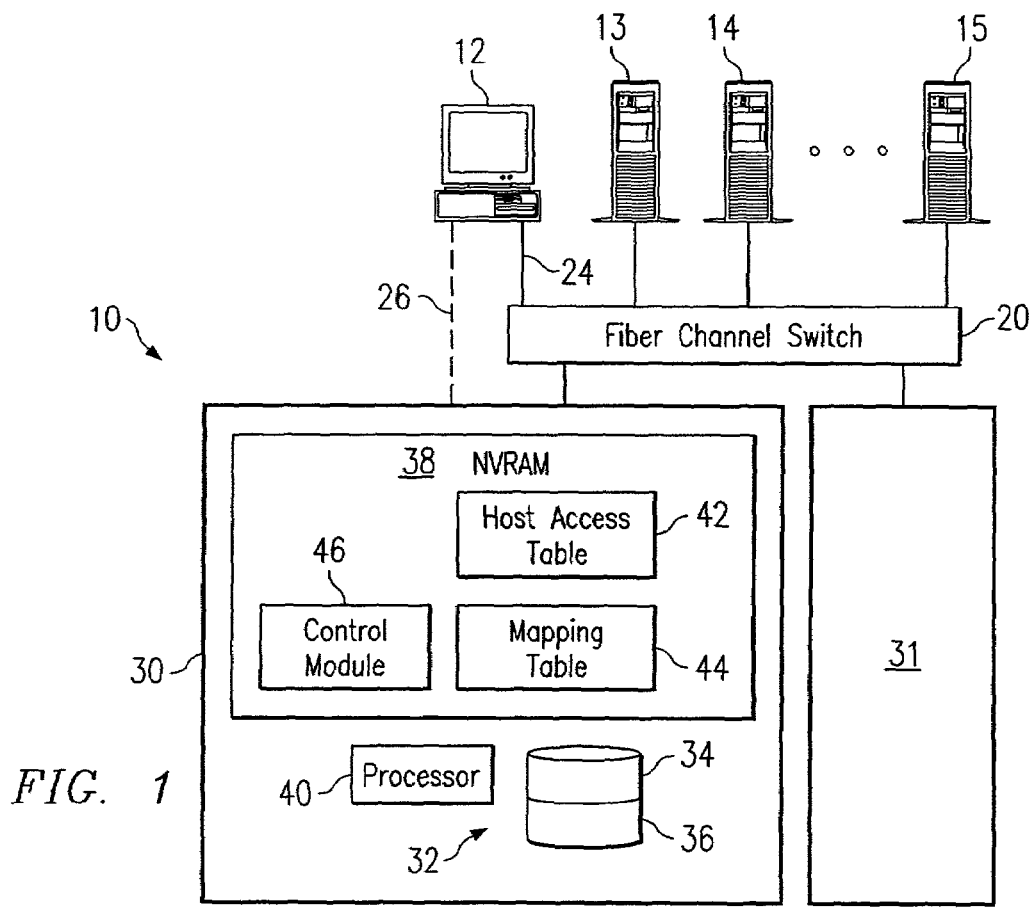
FIG. 1 presents a block diagram of an example storage area network (SAN)
FIGS. 2 and 3 depict example data structures in a storage device in the SAN of FIG. 1.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices, and various input and output (I/O) devices, such as a keyboard, a mouse, and a video display. The information handling system may also include one or more buses operable to transmit communications between the various hardware components.

A data storage device may be referred to as an information handling system, and a computer network may be referred to as a distributed information handling system. A computer network that includes multiple storage devices with redundant connections to multiple hosts via multiple switches may be referred to as a storage area network (SAN). As explained in the background above, a network administrator may configure a computer network such as a SAN with access rules that control which hosts may access which storage devices. A variety of methodologies have been used to control access to storage devices, including host-based controls, switch-based controls (e.g., switch zoning), and target-based controls. Certain disadvantages are associated with each of these methodologies.

With typical host-based controls, software on the hosts is used to limit which hosts will login to a given storage subsystem. Hosts may also be referred to as servers. A disadvantage typically associated with host-based controls is the rogue host problem. A rogue host is a host that lacks the proper configuration for access control. When access control logic resides on the hosts, there may be nothing to prevent rogue hosts from accessing storage devices in contradiction of desired access policies.

With typical switch-based controls, the network administrator configures the switches to limit the number of servers that can see any individual storage subsystem. However, the techniques required to implement switch zoning typically vary from manufacturer to manufacturer. Consequently, switch zoning can be difficult to implement in systems with switches from different manufactures. Also, improperly zoned SANs can cause failures. For example, it is possible for an administrator to configure a storage subsystem to grant access to a particular host (or set of hosts) only to have an improperly zoned switch network place the host and the storage subsystem in separate and mutually exclusive zones. The host will not be able to access the storage assigned to it by the administrator, thus preventing data access from occurring and resulting in the possible failure of the applications running on the host.

With target-based controls, the logic for controlling access resides predominantly in the storage devices, rather than in the switches or the hosts. A system using target-based controls may partition each storage device into logical storage units, such as small computer systems interface (SCSI) logical unit numbers (LUNs). LUN mapping tables in the storage devices may be used to determine which hosts can use which LUNs. This approach therefore avoids the rogue host problem and the problems associated with configuring switches from multiple vendors.

Early deployments of SANs tended to have less than 20 servers accessing storage subsystems. But as SANs become more accepted, information technology (IT) customers are beginning to request SANs with the capability of connecting numerous storage subsystems to thousands of servers. However, many storage subsystems will not allow access to large numbers of servers. Many storage subsystems limit access to thirty-two or fewer servers.

Specifically, in a typical SANs, all of the hosts in the SAN are required to login to each storage device, and each storage device uses a host access table to keep track of which hosts have logged in. For example, if a customer requested a SAN with one thousand hosts and one hundred storage devices, under the conventional approach, each of the one thousand hosts would login to each of the one hundred storage devices. Consequently, each storage device would be required to keep track of one thousand hosts in its host access table, even though the LUNs in certain storage devices might be mapped to only three or four hosts.

However, data storage devices for SANs typically do not include enough memory for a host access table to include one thousand hosts. For instance, a conventional storage device might include only enough memory for the host access table to keep track of thirty-two hosts. If a customer were to attempt to deploy such a storage device in a SAN with one thousand hosts, only the first thirty-two hosts which attempted to login would be able to access the storage device. All subsequent login requests would be rejected, until one of the first thirty-two hosts logged out.

Increasing the memory would be one approach to resolving this problem. However, that approach would be relatively expensive and inefficient, in that new hardware would be required.

As summarized above, the present disclosure relates to a storage device and a related access control method in which the host access table is not populated with all of the hosts in the SAN. Instead, the storage device generally adds hosts to the host access table only if those hosts are actually mapped to LUNs in the storage device. Consequently, even though such a storage device might include only a small amount of memory for the host access table, the storage device may nevertheless be used effectively in a SAN with many hosts. An advantage of this solution is that it does not require enlargement of the memory on the storage subsystem to allow more host logins. Also, it does not require host software to be installed on every server in the SAN. And, it does not require switch zoning to make the SAN operate correctly.

For purposes of illustration, this disclosure describes example embodiments of such a storage device and such an access control method. However, the present invention may also be used to control access to target devices in other types of distributed information handling systems or networks.

Referring now to FIG. 1, an example distributed information handling system 10 is used to illustrate various aspects of the invention and various additional or alternative features of the invention. Distributed information handling system 10 may also be referred to as network 10 or SAN 10. SAN 10 includes multiple workstations 12, 13, 14, and 15. Each workstation may contain its own set of processors, I/O ports, software, and other components. Workstations 12–15 may also be referred to as information handling systems or hosts.

SAN 10 may also include multiple storage devices 30 and 31 interconnected with workstations 12–15 via multiple fiber channel switches 20. However, to reduce the complexity of this disclosure, only one switch is illustrated. Storage devices 30 and 31 may also be referred to as storage enclosures 30 and 31. In the example embodiment, each workstation may include one or more host bus adapters (HBAs), with each HBA connected to a port on a different fiber channel switch via an in-band fiber channel connection 24. Generally, an HBA is a fiber channel interface card, such as a PCI or SBUS card, that plugs into a host. The multiple connections may provide for uninterrupted service in case any single HBA or fiber channel switch were to fail over. Each fiber channel switch may provide connectivity to more than one storage enclosure, as illustrated. Accordingly, SAN 10 may provide a highly reliable and flexible environment for information storage, retrieval, and utilization.

Storage device 30 may include a storage processor 40 and a disk drive 32. Disk drive 32 may be partitioned into multiple logical storage units, illustrated in FIG. 1 as LUNs 34 and 36. Storage device 30 may also include non-volatile RAM (NVRAM) 38 or other non-volatile memory that contains processing instructions and data structures used to control access. For instance, a control module 46 may include computer instructions that are executed by storage processor 40 to control which hosts may access disk drive 32. As described in greater detail below, those computer instructions may use a host access table 42 and a mapping table 44 from NVRAM 38 to make access control decisions. Storage device 31 may include the same or similar components.

As illustrated in FIG. 2 and described in greater detail below with reference to FIG. 4, host access table 42 may contain multiple entries or rows containing identifiers for hosts within SAN 10. Specifically, FIG. 2 shows thirty-two entries, with twenty-seven empty and five populated. The populated entries will give hosts with host identifiers 14, 18, 34, 154, and 2512 permission to login with the target device. For example, host identifiers 14, 18, 34, 154, and 2512 may be Fibre Channel World Wide Names (WWN) in a Fibre Channel SAN. A WWN is typically a unique, 64-bit address, and a WWN is typically assigned to each port. In storage networks based on other interconnect technologies (e.g., Ethernet), the host identifiers can be any identification mechanism that guarantees that an ID is associated to one and only one host. In any case, as described below, the target device will generally reject login requests by any hosts not listed in host access table 42. The target device can grant host access up to thirty-two hosts in the SAN regardless of the number of hosts in the SAN. In addition, one or more particular entries, such as the entry at index 0, may be reserved for management stations.

As depicted in FIG. 3, mapping table 44 may contain entries that associate particular hosts with one or more particular LUNs. For instance, in the example embodiment, each non-null entry in mapping table 44 contains an index, one or more identifiers for a particular host, and a list of LUNs associated with that host. For instance, the host identifiers may include host WWNs (e.g., HBA WWNs) or other types of identifiers. In FIG. 3, mapping table 44 shows LUN 0 assigned to host 18, LUNs 1 and 3 assigned to host 34, LUN 4 assigned to host 154, and LUNs 0 and 2 assigned to host 2512 in four respective entries. The remaining twenty-eight entries are empty.

In the example embodiment, the memory available for host access table 42 and mapping table 44 is limited. For instance, host access table 42 and mapping table 44 may each be limited to thirty-two entries. This disclosure describes a process that nevertheless allows effective deployment of data storage devices such as storage device 30 in SANs containing hundreds or thousands of hosts. Major components of that process may include (1) initialization of the internal data structures in the target device and host login access rules, (2) LUN assignment, granting host access to LUNs, and host notification to re-login with the target, and (3) LUN de-assignment and host login de-allocation.

Figure 4A:
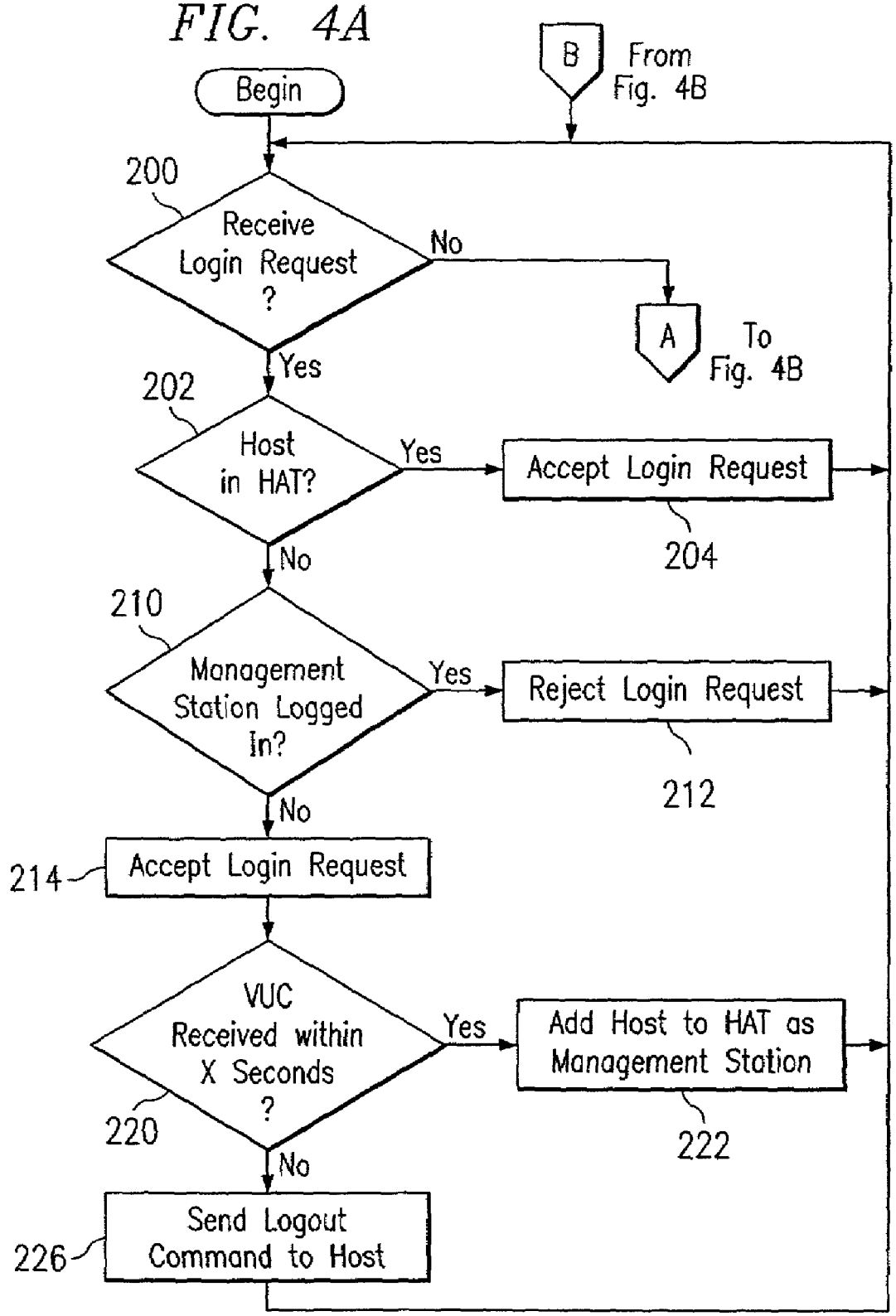
FIGS. 4A and 4B depict a flowchart of an example embodiment of a process according to the present invention for controlling access to storage in a distributed information handling system.
Figure 4B:
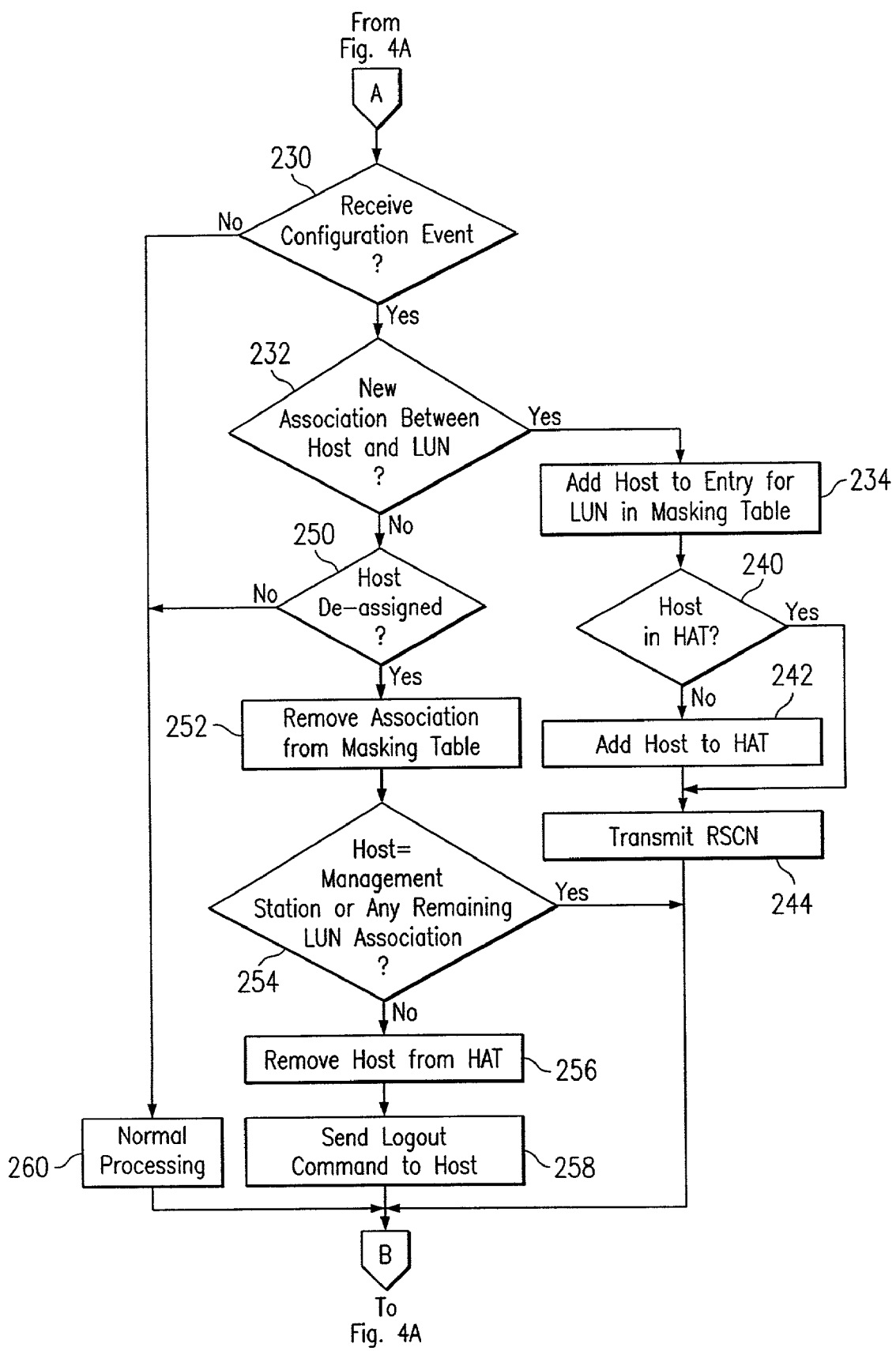

FIGS. 4A and 4B depict an example embodiment of a process for controlling access to storage in a distributed information handling system. That process begins with storage device 30 connected into SAN 10. Host access table 42 and mapping table 44 may or may not already be populated with data. For instance, if host access table 42 and mapping table 44 are empty, no hosts will be allowed to login with storage device 30, other than a management station. Before other hosts can have a successful login with the target, the administrator must assign or map LUNs to those hosts.

In other embodiments, other approaches may be used to configure storage device 30. For instance, as illustrated in FIG. 1, storage device 30 may accommodate an out of band connection 26, such as a serial or Ethernet connection, and storage device 30 may be configured with host identifiers via that connection 26. In such an embodiment, host access table 42 need not include any entries reserved for management stations, and the only hosts allowed to login with the target device may be those that have LUN(s) assigned to them.

Referring again to FIG. 4, at step 200 control module 46 in storage device 30 determines whether storage device 30 has received a login request from a host in SAN 10. If a login request has been received, control module 46 determines whether the host that transmitted the login request is listed in host access table 42, as shown at block 202. If the host is listed in host access table 42, control module 46 accepts the login request at block 204, and the process then returns to the top of the processing loop to receive additional communications from SAN 10.

However, if the host is not listed in host access table 42, the process passes from block 202 to block 210. At block 210, control module 46 determines whether a management station has logged in to storage device 30, for instance by looking for a host identifier at entry 0 of host access table 42. If a management station is already logged in, control module 46 rejects the login request at block 212, and the process returns to the top of the processing loop.

If no management station has logged in yet, control module 46 temporarily accepts the login request at block 214 and then waits a predetermined amount of time for a vendor unique command from the host. Control module 46 may also reject any other login requests received while waiting for the vendor unique command. At block 220, control module 46 determines whether the vendor unique command has been received from the host within the predetermined amount of time, and if so, control module 46 adds a host identifier for the host to host access table 42, as shown at block 222. In particular, the host identifier may be added to an entry reserved for management stations, such as entry 0. A host identifier in memory location reserved for management stations, such as entry 0 in the example embodiment, may be referred to as a management station identifier. The process may then return to the top of the processing loop.

However, if control module 46 does not receive the vendor unique command from the host within the predetermined time, control module 46 sends a logout command to the host at block 226. The process may then return to the top of the processing loop, and Control module 46 may resume accepting login commands. A management station in SAN 10 may be programmed to attempt logging in with storage devices every X seconds for Y attempts, in case, as described above, a storage device is temporarily not accepting logins.

Referring again to block 200, if control module 46 determines that it has not received a login request, the process passes through page connector A to block 230. Control module 46 then determines whether storage device 30 has received a configuration event from a management station in SAN 10 or from an out-of-band management station. For example, configuration events may include commands from an administrator to assign or de-assign a specified LUN and a specified host. The event may include the host's HBA WWNs and the LUN on the target device to be assigned or de-assigned.

If a configuration event has been received, control module 46 determines at block 232 whether the configuration event is intended to configure a new association between a host and a LUN. If so, control module 46 adds or updates an entry in mapping table 44 for the host specified in the configuration event to associate that host with the LUN specified in the configuration event, as shown at block 234. For instance, with reference to entry 1 in mapping table 44, if host 34 was already mapped to LUN 1, and the configuration event defined an association between host 34 and LUN 3, control module 46 may add LUN 3 to entry 1, to result in the entry illustrated.

Control module 46 then determines at block 240 whether the specified host is listed in host access table 42. If not, control module 46 adds the specified host to host access table 42 and sends a notification to the host so that the host knows to login in with the target to accesses the newly assigned LUN, as indicated at blocks 242 and 244. For instance, the notification could be a fabric wide registered state change notification (RSCN), a port specific RSCN, or possibly a vender unique asynchronous event notification command. The event notification preferably causes the host to login with the target device, for example by sending port and process login commands such as PLOGI and PRLI to the target device. Thus, storage device 30 generally adds hosts to host access table 42 only if those hosts are actually mapped to LUNs in the storage device. The process may then pass through page connector B to the top of the processing loop.

However, referring again to block 232, if the configuration event does not define a new association between a host and a LUN, the process passes to block 250, and control module 46 determines whether the configuration event de-assigns a host from a LUN. If so, at block 252, control module 46 removes the association between the specified host and the specified LUN from mapping table 44. At block 254, control module 46 determines whether the specified host is a management station or if mapping table 44 contains any remaining entries that associate the specified host with a LUN. If the host is a management station or if any associations remain, the process may pass through page connector B to return to the top of the processing loop. However, if the host is not a management station and mapping table 44 contains no entries associating the specified host with a LUN, control module 46 removes the specified host from host access table 42, as depicted at block 256. Control module 46 then sends a logout command, such as LOGO, to the specified host at block 258. The process may then return to the top of the processing loop via page connector B.

However, if the determinations depicted at blocks 230 or 250 are negative, storage device 30 uses normal processing to handle communications from host in SAN 10, as shown at block 260. The process may then pass through page connector B to the top of the processing loop, with storage device 30 receiving additional login requests, configuration events, or other communications from hosts in SAN 10.

Thus, according to the example embodiment, host access table 42 contains host identifiers only for hosts that are actually associated with LUNs in storage device 30, and possibly management stations. Consequently, even though SAN 10 may include hundreds or thousands of hosts, host access table 42 need only accommodate entries for hosts that are specifically associated with LUNs in storage device 30.

In the embodiment described above, vendor unique commands may be used to identify management stations for storage device 30. However, in an alternative process, storage device 30 may be configured with identifiers for one or more management stations before storage device 30 is connected into SAN 10. For example, an administrator initially may connect only storage device 30 and workstation 12. The administrator may then preconfigure entry 0 in host access table 42 with a host identifier such as a WWN for workstation 12. Then, once connected into LAN 10, storage device 30 may recognize workstation 12 as a management station and therefore allow it to have access.

In the example embodiment, storage device 30 preserves the information in mapping table 44 and host access table 42 despite a power cycle. Consequently, when a target device or a host in the SAN is powered up, only hosts that have been granted access will be able to login with the target device.

In conclusion, the present disclosure relates to a system and method for managing access to storage devices in computer networks. In an example embodiment, no additional memory is required, and the process may be implemented by simply changing firmware in the RAID controller, for instance. Furthermore, an administrator need not configure the switches or the hosts for access control and need only configure the target devices. The target devices may do the login acceptance and rejection, and the target devices may generally prevent hosts from login if there is no good reason for those hosts to login. For instance, a host may be prevented from login if the host will never access LUNs in the target device and does not even have permission to access LUNs in the target device.

In addition, the solution described herein may remain effective as the number of host nodes in a SAN grows, without requiring any future modification of the target device's hardware and firmware. This solution may also be used for any storage network, including without limitation, Fibre Channel, iSCSI, InfiniBand, and possibly other future networking technologies.

Although the present invention has been described with reference to one or more example embodiments, those with ordinary skill in the art will understand that numerous variations of those embodiments could be practiced without departing from the scope and spirit of the present invention. For example, the hardware and software components depicted in the example embodiment represent functional elements that are reasonably self-contained so that each can be designed, constructed, or updated substantially independently of the others. In alternative embodiments, however, it should be understood that the components may be implemented using other combinations of hardware and software. In alternative embodiments, information handling systems incorporating the invention may include personal computers, mini computers, mainframe computers, distributed computing systems, and other suitable devices. For example, in alternative embodiments, the invention may be used to connect tape libraries and RAID subsystems into a computer network.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the illustrated embodiment or implementation but is defined by the appended claims.

What is claimed is:

1. A method for controlling access to a storage device in a distributed information handling system, the method comprising:

receiving, at a storage device coupled to a distributed information handling system comprising a plurality of hosts, a login request from one of the plurality of hosts;

in response to the login request, determining whether a host access table in the storage device includes an identifier for the host, wherein the host access table comprises identifiers for fewer than all of the plurality of hosts;

allowing the host to log into the storage device if the host access table includes the identifier for the host;

preventing the host from logging into the storage device if the host access table does not include the identifier for the host; and recognizing the host as a management station, if the storage device receives a vendor unique command from the host within a predetermined time after receiving the login request from the host.

2. The method of claim 1, further comprising:

recognizing whether the host is a management station;

allowing the host to access the storage device if (a) the host has been recognized as a management station or (b) the host access table includes the identifier for the host; and preventing the host from using the storage device if (a) the host has not been recognized as a management station and (b) the host access table does not include the identifier for the host.

3. The method of claim 1, further comprising the operation of recognizing the host as a management station, in response to determining that an identifier for the host matches a management station identifier in the storage device.

4. The method of claim 1, further comprising:

configuring the storage device with a management station identifier; and recognizing the host as a management station in response to determining that an identifier for the host matches the management station identifier.

5. The method of claim 1, further comprising the operation of adding the host to the host access table as a management station, in response to recognizing the host as a management station.

6. The method of claim 1, wherein preventing the host from using the storage device comprises:

temporarily accepting the login request; and sending a logout command to the host if the storage device does not receive a vendor unique command from the host within the predetermined time.

7. The method of claim 1, further comprising:

adding entries to a mapping table in the storage device, wherein the entries define relationships between specified logical storage units in the storage device and specified hosts; and allowing the host to access the storage device only if (a) at least one of the entries in the mapping table includes the host or (b) the host has been recognized as a management station.

8. The method of claim 7, wherein:

the operation of adding entries to the mapping table is performed in response to input from an administrator received at the storage device, wherein the input specifies the relationships to be defined between the specified logical storage units and the specified hosts; and the entries in the mapping table include identifiers for the specified hosts and a list of corresponding logical storage units.

9. The method of claim 1, further comprising:

in response to input from an administrator specifying relationships to be defined between specified logical storage units in the storage device and specified hosts, adding entries to a mapping table in the storage device to represent the specified relationships; and adding the specified hosts to the host access table, if the specified hosts are not already included in the host access table.

10. A storage device for use in a distributed information handling system including a plurality of hosts, the storage device comprising:

a storage medium;

a communications interface in communication with the storage medium;

a host access table comprising one or more identifiers associates with one or more of the plurality of hosts; and a control module in communication with the communications interface and the host access table, wherein the control module performs operations comprising:

receiving a login request from one of the plurality of hosts included in the distributed information handling system;

in response to the login request, determining whether the host access table includes an identifier for the requesting host;

accepting the login request if the storage device receives a vendor unique command from the host within a predetermined time after receiving the login request from the host; and rejecting the login request if the storage device does not receive a vendor unique command from the host within a predetermined time after receiving the login request from the host.

11. The storage device of claim 10, further comprising:

logical storage units within the storage medium; and a mapping table in communication with the control module, wherein the control module performs further operations comprising:

receiving commands from an administrator to allow access from specified hosts to the logical storage units;

in response to the commands, updating the mapping table to associate the specified hosts with the logical storage units; and accepting login requests only if the login requests come either from the specified hosts that have been associated with the logical storage units or from a management station.

12. The storage device of claim 10, wherein the control module performs further operations comprising:

preconfiguring the storage device with a management station identifier before communications between the storage device and the distributed information handling system commence; and recognizing the host as the management station in response to determining that an identifier in the login request from the host matches the management station identifier.

13. The storage device of claim 10, wherein:

the distributed information handling system comprises a storage area network (SAN);

the storage device comprises a disk drive in the SAN;

the host comprises a server in the SAN, the server including a world wide name (WWN); and the operation of accepting the login request comprises accepting the login request if the host access table includes the host's WWN.

14. A program product for controlling access to a storage device in a distributed information handling system comprising a plurality of hosts, the program product comprising:

a computer-usable medium; and a control module encoded in the computer-usable medium, the control module including instructions that, when executed by a processor of a storage device, perform operations comprising:

receiving, at the storage device, a request from one of the plurality of hosts to login to the storage device;

in response to the login request, determining whether a host access table in the storage device includes an identifier for the host, wherein the host access table comprises identifier for a portion of the plurality of the hosts;

allowing the host to access the storage device if the host access table includes the identifier for the host; and preventing the host from accessing the storage device if the host access table does not include the identifier for the host.

15. The program product of claim 14, wherein the operation performed by the control module further comprise:

recognizing whether the host is a management station if the storage device receives a vendor unique command from the host within a predetermined time after receiving the login request from the host;

allowing the host to access the storage device if (a) the host has been recognized as a management station or (b) the host access table includes the identifier for the host; and preventing the host from using the storage device if (a) the host has not been recognized as a management station and (b) the host access table does not include the identifier for the host.

16. The program product of claim 14, wherein the operation performed by the control module further comprise recognizing the host as a management station, in response to determining that an identifier for the host matches a management station identifier in the storage device.

17. The program product of claim 14, wherein the operation performed by the control module further comprise:

adding entries to a mapping table in the storage device, wherein the entries define relationships between specified logical storage units in the storage device and specified hosts; and allowing the host to access the storage device only if (a) at least one of the entries in the mapping table includes the host or (b) the host has been recognized as a management station.

* * * * *